(12) United States Patent
He et al.

(10) Patent No.: US 12,684,506 B2
(45) Date of Patent: Jul. 14, 2026

(54) UTILIZING SSB MEASUREMENTS TO IMPROVE SCELL ACTIVATION

(71) Applicant: Apple Inc., Cupertino, CA (US)

(72) Inventors: Qunfeng He, San Diego, CA (US); Amir Farajidana, Sunnyvale, CA (US); Dietmar Gradl, Ebersberg (DE); Hongbo Yan, Vista, CA (US)

(73) Assignee: Apple Inc., Cupertino, CA (US)

( * ) Notice: Subject to any disclaimer, the term of this patent is extended or adjusted under 35 U.S.C. 154(b) by 549 days.

(21) Appl. No.: 18/119,105

(22) Filed: Mar. 8, 2023

(65) Prior Publication Data

US 2023/0362852 A1 Nov. 9, 2023

Related U.S. Application Data

(60) Provisional application No. 63/325,585, filed on Mar. 30, 2022.

(51) Int. Cl.
| | |
|---|---|
| *H04W 56/00* | (2009.01) |
| *H04L 5/00* | (2006.01) |
| *H04L 27/26* | (2006.01) |

(52) U.S. Cl.
CPC ....... *H04W 56/0015* (2013.01); *H04L 5/0057* (2013.01); *H04L 27/2657* (2013.01)

(58) Field of Classification Search
CPC ............ H04W 56/0015; H04W 56/001; H04L 5/0057; H04L 27/2657; H04L 5/001; H04L 5/0048; H04L 27/2675; H04B 7/0632; H04B 7/06952

USPC .......................................................... 370/350
See application file for complete search history.

(56) References Cited

U.S. PATENT DOCUMENTS

| | | | | |
|---|---|---|---|---|
| 2011/0150044 A1* | 6/2011 | Rousseaux | ......... | H04B 1/71637 |
| | | | | 375/147 |
| 2020/0052844 A1* | 2/2020 | Yu | ......... | H04W 72/23 |
| 2020/0351041 A1* | 11/2020 | Lin | ......... | H04L 5/0092 |
| 2021/0251040 A1* | 8/2021 | Tang | ......... | H04W 56/001 |
| 2022/0183017 A1* | 6/2022 | Wu | ......... | H04W 72/20 |
| 2022/0200675 A1* | 6/2022 | Raghavan | ......... | H04B 7/0695 |
| 2022/0393809 A1* | 12/2022 | Gao | ......... | H04B 7/01 |
| 2023/0254940 A1* | 8/2023 | Tang | ......... | H04L 5/0098 |
| | | | | 370/329 |

(Continued)

FOREIGN PATENT DOCUMENTS

| | | | | | |
|---|---|---|---|---|---|
| CN | 113259967 A | * | 8/2021 | ........... | H04L 5/0098 |
| DE | 102020110803 A1 | * | 11/2020 | ........... | H04L 5/0098 |

(Continued)

*Primary Examiner* — Nicholas A Jensen
*Assistant Examiner* — Oladiran Gideon Olaleye
(74) *Attorney, Agent, or Firm* — Fish & Richardson P.C.

(57) ABSTRACT

Disclosed are methods, systems, and computer-readable medium to perform operations including: determining time or frequency synchronization information for each of one or more candidate synchronization signal blocks (SSBs) for a secondary cell (SCell) before receipt of a transmission configuration indication (TCI) state activation command or a SCell activation command, receiving the TCI state activation command, and based on the received TCI state activation command, receiving at least one signal from the SCell using the determined time or frequency synchronization information for one of the one or more candidate SSBs.

19 Claims, 6 Drawing Sheets

100

(56)          References Cited

U.S. PATENT DOCUMENTS

2023/0354221 A1 *   11/2023   Han ...................... H04L 5/0048
2024/0171997 A1 *    5/2024   Du ..................... H04B 7/06952

FOREIGN PATENT DOCUMENTS

WO       WO-2020205802 A1 *  10/2020   ......... H04B 7/06958
WO       WO-2022155302 A2 *   7/2022   ...... H04W 36/00837

* cited by examiner

400

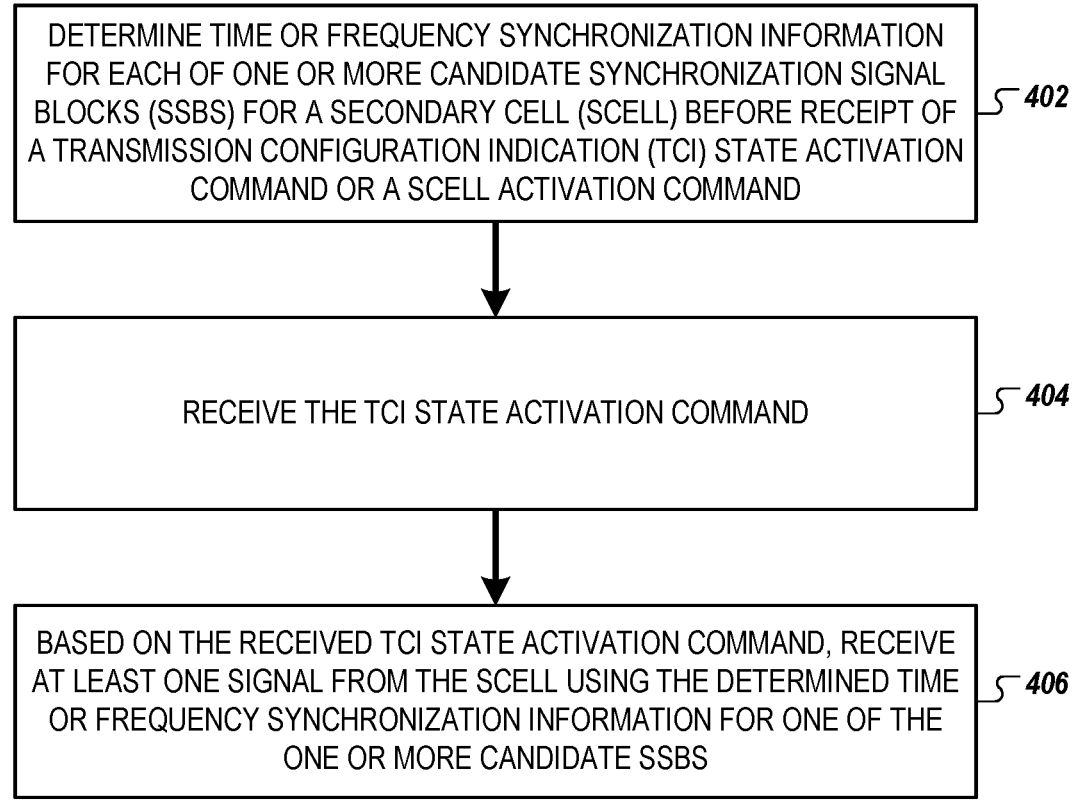

DETERMINE TIME OR FREQUENCY SYNCHRONIZATION INFORMATION FOR EACH OF ONE OR MORE CANDIDATE SYNCHRONIZATION SIGNAL BLOCKS (SSBS) FOR A SECONDARY CELL (SCELL) BEFORE RECEIPT OF A TRANSMISSION CONFIGURATION INDICATION (TCI) STATE ACTIVATION COMMAND OR A SCELL ACTIVATION COMMAND ⎫ 402

RECEIVE THE TCI STATE ACTIVATION COMMAND ⎫ 404

BASED ON THE RECEIVED TCI STATE ACTIVATION COMMAND, RECEIVE AT LEAST ONE SIGNAL FROM THE SCELL USING THE DETERMINED TIME OR FREQUENCY SYNCHRONIZATION INFORMATION FOR ONE OF THE ONE OR MORE CANDIDATE SSBS ⎫ 406

FIG. 4

UTILIZING SSB MEASUREMENTS TO IMPROVE SCELL ACTIVATION

CROSS-REFERENCE TO RELATED APPLICATIONS

This application claims priority to and the benefit of U.S. Provisional Patent Application No. 63/325,585, filed Mar. 30, 2022, the entire contents of which is incorporated herein by reference.

BACKGROUND

Wireless communication networks provide integrated communication platforms and telecommunication services to wireless user devices. Example telecommunication services include telephony, data (e.g., voice, audio, and/or video data), messaging, internet-access, and/or other services. The wireless communication networks include wireless access nodes and wireless devices (e.g., user equipment) that exchange wireless signals according to wireless network protocols, such as protocols described in various telecommunication standards promulgated by the Third Generation Partnership Project (3GPP) and other standardized and non-standardized protocols.

SUMMARY

The technology described here improves secondary cell (SCell) activation by storing time, frequency, and/or power information for a priority list of synchronization signal blocks (SSBs) before receipt of a transmission configuration indication (TCI) state indication. The priority list of candidate SSBs can include those SSBs corresponding to transmission beams that the network is likely to select for communication with a user equipment (UE), and may be determined or prioritized by the UE based on SSB-related measurements. Once the TCI state is received during the SCell activation procedure, the UE can leverage the stored time, frequency, and/or power information for a selected SSB to complete SCell activation without additional steps and/or time for time and frequency tracking, which may lead to a faster SCell activation.

In accordance with one aspect of the present disclosure, techniques for improving SCell activation include storing time or frequency synchronization information for each of one or more candidate SSBs before receipt of a TCI state activation command or an SCell activation command, or both, receiving the TCI state activation command, and based on the TCI state activation command, receiving at least one signal from the SCell using the determined time or frequency synchronization information for one of the one or more candidate SSBs.

The details of one or more embodiments of these systems and methods are set forth in the accompanying drawings and the description below. Other features, objects, and advantages of these systems and methods will be apparent from the description and drawings, and from the claims.

BRIEF DESCRIPTION OF THE FIGURES

FIG. 4 illustrates a flowchart of an example process, in accordance with some embodiments.

DETAILED DESCRIPTION

Carrier aggregation is a technique that aims to increase network capacity and data rate by aggregating multiple contiguous or non-contiguous frequency blocks to a user equipment (UE). When carrier aggregation is used, a primary cell (PCell) and one or more secondary cells (SCells) are configured between the UE and the network. SCells can be dynamically activated (or deactivated) to account for changes in network traffic, movement of the UE, or any of a variety of other reasons. To activate an SCell, the UE performs an SCell activation procedure that includes a sequence of operations to prepare the UE and the SCell for subsequent communications. Each of these operations take time, which induces delay in SCell activation.

The technology described here improves SCell activation by configuring a UE to store time, frequency, and/or power information (e.g., time offsets, frequency offsets, and/or received power measurements) for a priority list of synchronization signal blocks (SSBs) before receipt of a transmission configuration indication (TCI) state indication. Once the TCI state is received, the UE can leverage its prior knowledge of the time, frequency, and/or power information for a selected SSB to complete SCell activation without the need for additional time and frequency tracking. In this manner, the time needed to complete SCell activation may be reduced, thereby reducing activation latency and increasing network efficiency, among other things.

Figure 1:
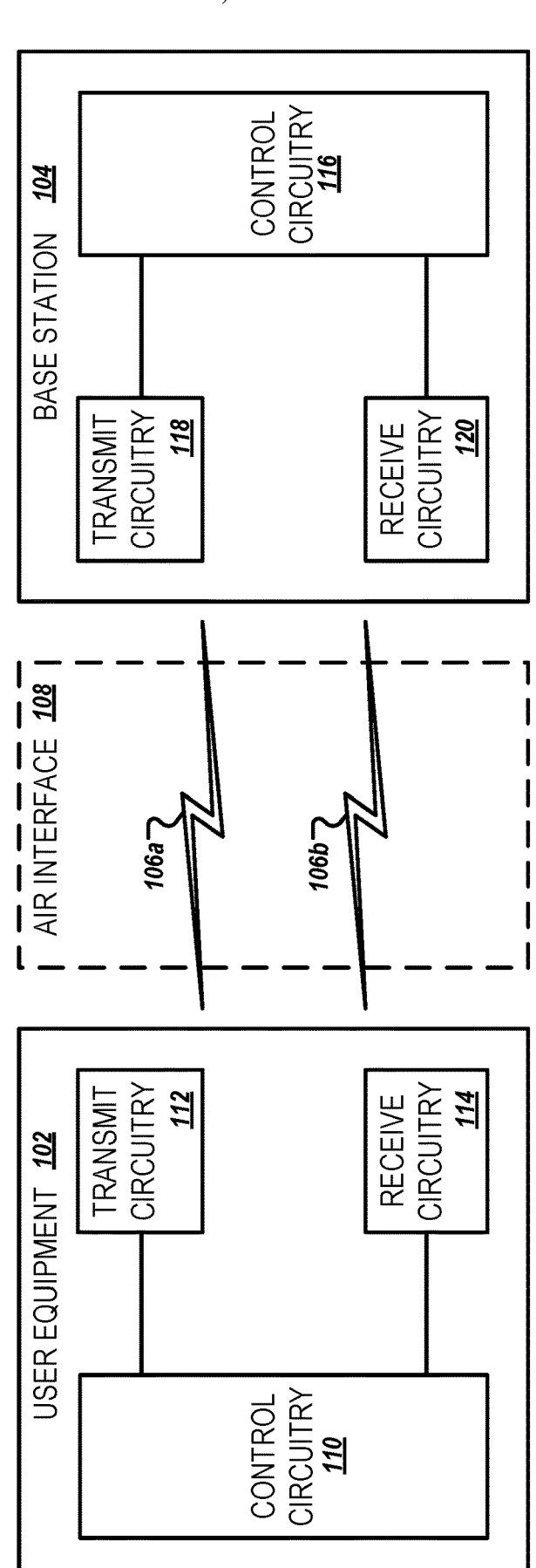
FIG. 1 illustrates a wireless network, in accordance with some embodiments.

FIG. 1 illustrates a wireless network 100, in accordance with some embodiments. The wireless network 100 includes a UE 102 and a base station 104 connected via one or more channels 106A, 106B across an air interface 108. The UE 102 and base station 104 communicate using a system that supports controls for managing the access of the UE 102 to a network via the base station 104.

For purposes of convenience and without limitation, the wireless network 100 is described in the context of Long Term Evolution (LTE) and Fifth Generation (5G) New Radio (NR) communication standards as defined by the Third Generation Partnership Project (3GPP) technical specifications (TSs). More specifically, the wireless network 100 is described in the context of a Non-Standalone (NSA) networks that incorporate both LTE and NR, for example, E-UTRA (Evolved Universal Terrestrial Radio Access)-NR Dual Connectivity (EN-DC) networks, and NE-DC networks. However, the wireless network 100 may also be a Standalone (SA) network that incorporates only NR. Furthermore, other types of communication standards are possible, including future 3GPP systems (e.g., Sixth Generation (6G)) systems, IEEE 802.16 protocols (e.g., WMAN, WiMAX, etc.), or the like. While aspects may be described herein using terminology commonly associated with 5G NR, aspects of the present disclosure can be applied to other systems, such as 3G, 4G, and/or systems subsequent to 5G (e.g., 6G).

In the wireless network 100, the UE 102 and any other UE in the system may be, for example, laptop computers, smartphones, tablet computers, printers, machine-type devices such as smart meters or specialized devices for healthcare monitoring, remote security surveillance systems, intelligent transportation systems, or any other wireless devices with or without a user interface. In network 100, the base station 104 provides the UE 102 network connectivity to a broader network (not shown). This UE 102 connectivity is provided via the air interface 108 in a base station service area provided by the base station 104. In some embodiments, such a broader network may be a wide area network operated by a cellular network provider, or may be the Internet. Each base station service area associated with the base station 104 is supported by antennas integrated with the base station 104. The service areas are divided into a number of sectors associated with certain antennas. Such sectors may be physically associated with fixed antennas or may be assigned to a physical area with tunable antennas or antenna settings adjustable in a beamforming process used to direct a signal to a particular sector.

The UE 102 includes control circuitry 110 coupled with transmit circuitry 112 and receive circuitry 114. The transmit circuitry 112 and receive circuitry 114 may each be coupled with one or more antennas. The control circuitry 110 may be adapted to perform operations associated with selection of codecs for communication and to adaption of codecs for wireless communications as part of system congestion control. The control circuitry 110 may include various combinations of application-specific circuitry and baseband circuitry. The transmit circuitry 112 and receive circuitry 114 may be adapted to transmit and receive data, respectively, and may include radio frequency (RF) circuitry or front-end module (FEM) circuitry, including communications using codecs as described herein.

In various embodiments, aspects of the transmit circuitry 112, receive circuitry 114, and control circuitry 110 may be integrated in various ways to implement the circuitry described herein. The control circuitry 110 may be adapted or configured to perform various operations such as those described elsewhere in this disclosure related to a UE. The transmit circuitry 112 may transmit a plurality of multiplexed uplink physical channels. The plurality of uplink physical channels may be multiplexed according to time division multiplexing (TDM) or frequency division multiplexing (FDM) along with carrier aggregation. The transmit circuitry 112 may be configured to receive block data from the control circuitry 110 for transmission across the air interface 108. Similarly, the receive circuitry 114 may receive a plurality of multiplexed downlink physical channels from the air interface 108 and relay the physical channels to the control circuitry 110. The plurality of downlink physical channels may be multiplexed according to TDM or FDM along with carrier aggregation. The transmit circuitry 112 and the receive circuitry 114 may transmit and receive both control data and content data (e.g., messages, images, video, etc.) structured within data blocks that are carried by the physical channels.

FIG. 1 also illustrates the base station 104. In embodiments, the base station 104 may be an NG radio access network (RAN) or a 5G RAN, an E-UTRAN, a non-terrestrial cell, or a legacy RAN, such as a UTRAN or GERAN. As used herein, the term "NG RAN" or the like may refer to the base station 104 that operates in an NR or 5G wireless network 100, and the term "E-UTRAN" or the like may refer to a base station 104 that operates in an LTE or 4G wireless network 100. The UE 102 utilizes connections (or channels) 106A, 106B, each of which includes a physical communications interface or layer.

The base station 104 circuitry may include control circuitry 116 coupled with transmit circuitry 118 and receive circuitry 120. The transmit circuitry 118 and receive circuitry 120 may each be coupled with one or more antennas that may be used to enable communications via the air interface 108.

The control circuitry 116 may be adapted to perform operations for analyzing and selecting codecs, managing congestion control and bandwidth limitation communications from a base station, determining whether a base station is codec aware, and communicating with a codec-aware base station to manage codec selection for various communication operations described herein. The transmit circuitry 118 and receive circuitry 120 may be adapted to transmit and receive data, respectively, to any UE connected to the base station 104 using data generated with various codecs described herein. The transmit circuitry 118 may transmit downlink physical channels including multiple downlink subframes. The receive circuitry 120 may receive a plurality of uplink physical channels from various UEs, including the UE 102.

In this example, the one or more channels 106A, 106B are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, an Advanced long term evolution (LTE-A) protocol, a LTE-based access to unlicensed spectrum (LTE-U), a 5G protocol, a NR protocol, an NR-based access to unlicensed spectrum (NR-U) protocol, and/or any of the other communications protocols discussed herein. In embodiments, the UE 102 may directly exchange communication data via a ProSe interface. The ProSe interface may alternatively be referred to as a SL interface and may include one or more logical channels, including but not limited to a PSCCH, a PSSCH, a PSDCH, and a PSBCH.

In some examples, a UE (e.g., the UE 102) and a base station (e.g., the base station 104) can employ carrier aggregation (CA) techniques to communicate with one another. CA aims to increase network capacity and data rate by aggregating multiple contiguous or non-contiguous frequency blocks, or component carriers (CCs), to a single user. When CA is used, multiple serving cells are configured between the UE and the network (e.g., the base station), with each serving cell corresponding to a DL CC, an UL CC, or both. In general, the serving cells include a primary cell (PCell) and one or more secondary cells (SCells). The PCell can be the first serving cell that is established (e.g., after an initial access procedure), and can be responsible for handling the radio resource control (RRC) connection. The SCells can be subsequently configured through RRC signaling on the PCell.

SCells can be dynamically activated (or deactivated) to account for changes in network traffic, movement of the UE, or any of a variety of other reasons. For example, when traffic between the UE and the network is low, one or more SCells may be in a deactivated state. When the network detects an increase in traffic to or from the UE, the network can transmit an activation command to cause the UE to activate one or more configured SCells. In order to activate an SCell, the UE performs an SCell activation procedure that includes a sequence of operations to prepare the UE and the SCell for subsequent communications. Each of these operations take time, which induces delay in SCell activation.

Figure 2:
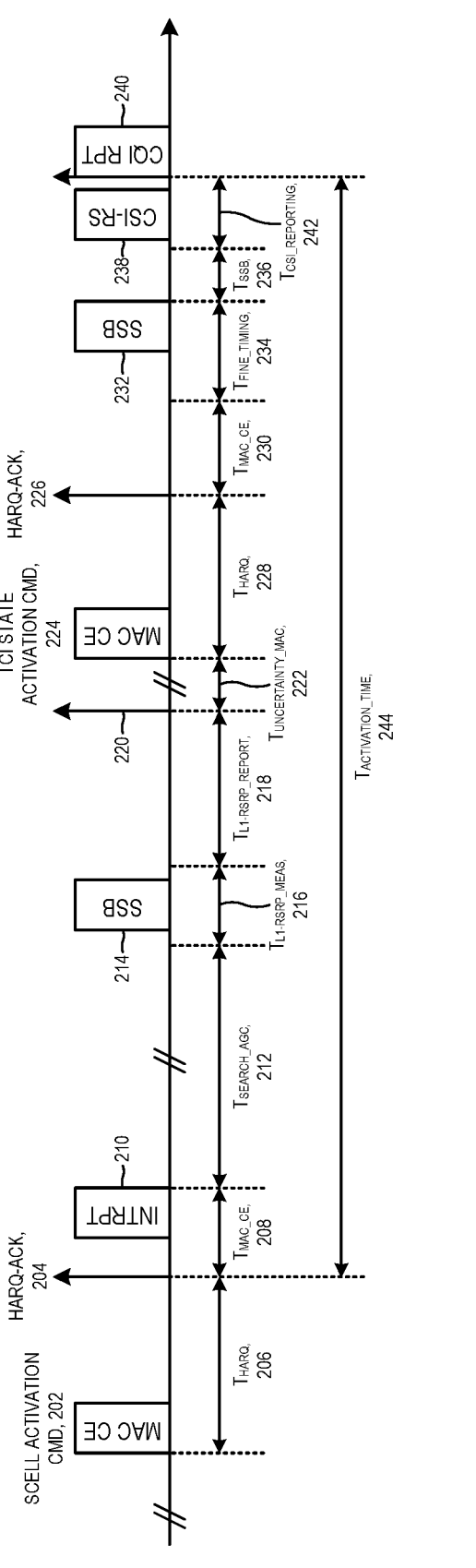
FIG. 2 illustrates a secondary cell (SCell) activation procedure, in accordance with some embodiments.

FIG. 2 illustrates an example SCell activation procedure 200 in accordance with some embodiments. To initiate SCell activation, the network sends an SCell activation command 202 to the UE. The activation command can be in a form of a medium access control (MAC) control element (CE) command, such as described in 3GPP TS38.321 (v.16.7.0)

section 6.1.3.10, the entire content of which is incorporated herein by reference. In some examples, other signaling, such as downlink control information (DCI), can be used to trigger activation. The activation command can specify one or more SCell indices corresponding to the SCell(s) to be activated (sometimes referred to as target SCell(s)).

Upon receipt of the SCell activation command 202, the UE can decode and verify the command. Once verified, the UE can transmit a hybrid automatic repeat request acknowledgement (HARQ-ACK) 204 to the network. The delay between the SCell activation command 202 and the HARQ-ACK 204 is denoted $T_{HARQ}$ 206. After acknowledging the SCell activation command, the UE is allotted time for post-processing and RF preparation/tuning (e.g., parsing and applying the MAC-CE). The delay resulting from these operations is denoted $T_{MAC\_CE}$ 208, which can be up to 3 ms in some examples. In some examples, DL and/or UL transmissions are interrupted 210 for some or all of $T_{MAC\_CE}$ 208.

If the target SCell is unknown to the UE, the UE can perform cell search and automatic gain control (AGC) tuning operations to identify the target SCell. The delay incurred by these operations is denoted $T_{SEARCH\_AGC}$ 212. In some examples, $T_{SEARCH\_AGC}$ 212 has a length of $24*T_{rs}$, where $T_{rs}$ is an SSB measurement timing configuration (SMTC) periodicity of the target SCell (or another measurement object).

In 5G NR, the network can employ multiple directional transmitter beams to serve the UE. Thus, after the cell search and AGC operations, the network may still need to determine which transmitter beam the SCell should use to transmit to the UE. To make this determination, the network (e.g., the base station) can transmit a sequence of SSBs 214 (sometimes referred to as an SSB burst) to the UE, with each SSB in the SSB burst being transmitted by a different transmission beam. Such an SSB burst can be transmitted periodically (e.g., with a period of 10 ms, 20 ms, etc.). The UE performs L1 reference signal received power (RSRP) measurements on each received SSB 214 during a time $T_{L1\text{-}RSRP\_MEAS}$ 216. In some examples, such as when the UE has multiple receive beams, the UE can measure the RSRP of each beam link pair.

After completing the L1-RSRP measurements, the UE generates a L1-RSRP report for transmission 220 to the network. In general, the L1-RSRP report indicates the link quality of each beam (or each beam pair link), thereby identifying the best transmitter beam(s) for downlink transmission by the SCell (and the best receiver beam(s) for receiving a signal from a particular transmitter beam). In some examples, the L1-RSRP measurements can be reported from L1 (e.g., the physical layer) to L3 (e.g., the RRC layer) at the UE, and the UE can derive a L3-RSRP report from the L1-RSRP measurements. The process of generating and transmitting the L1 and/or L3 RSRP report can occur during a time $T_{L1\text{-}RSRP\_REPORT}$ 218.

The network selects the optimal beam for transmission to the UE based on the received report. Once the transmission beam has been selected, the network indicates an SSB corresponding to the selected beam to the UE over an active PCell or SCell. In some examples, the indication is in the form of a MAC-CE transmission configuration indication (TCI) state activation command 224 transmitted to the UE after an uncertainty period $T_{UNCERTAINTY\_MAC}$ 222. The TCI state identified in the command can indicate an index of the SSB corresponding to the selected beam. This SSB can later be used for time-frequency tracking on the SCell, as discussed below. In some examples, the TCI state can also specify a quasi-co-location (QCL) type to indicate to the UE that the identified SSB is quasi-co-located with a subsequently transmitted signal. For example, the TCI state can indicate an SSB that is quasi-co-located with a physical downlink control channel (PDCCH), a physical downlink shared channel (PDSCH), or channel state information reference signals (CSI-RS) of the target SCell. In some examples, multiple MAC-CE commands can be received to indicate TCI states for some or all of the PDCCH, PDSCH, and CSI-RS, among others.

Upon receipt of the TCI state activation command 224, the UE can decode and verify the command. Once verified, the UE can transmit a HARQ-ACK 226 to the network. The delay between the TCI state activation command 224 and the HARQ-ACK 226 is denoted $T_{HARQ}$ 228. After acknowledging the TCI state activation command, the UE is allotted time for post-processing and RF tuning to prepare for receiving synchronization signals from the target SCell. The delay resulting from these operations is denoted $T_{MAC\_CE}$ 230, which can be up to 3 ms in some examples.

From here, the UE can perform a time and frequency synchronization process on the identified SSB 232 for the target SCell. In general, this process can include receiving the identified SSB and performing measurements, such as timing offset (TO) and/or frequency offset (FO) measurements, in order to determine the TO, FO, and/or other time or frequency synchronization information for the SSB. In doing so, the UE is prepared for subsequent operations such as monitoring the PDSCH and/or the PDCCH of the target SCell, or measuring CSI-RS signals from the SCell for a CSI reporting process (e.g., channel quality indicator (CQI) reporting). The time and frequency synchronization process induces a delay $T_{FINE\_TIMING}$ 234+$T_{SSB}$ 236. The delay $T_{FINE\_TIMING}$ 234 corresponds to the time period between completion of the processing of the last MAC CE TCI state activation command, and the timing of the first (or second, third, etc., depending on implementation) complete available SSB associated with the TCI state. The delay $T_{SSB}$ 236 corresponds to the allotted time for processing the received SSB, which can be up to 2 ms in some examples.

Once the UE has obtained the time and frequency synchronization information (e.g., the TO/FO), the CSI reporting process can be performed. In general, the CSI reporting process can include receiving a CSI-RS 238 transmitted from the target SCell, performing measurements on the received CSI-RS 238 to generate a CQI report 240, and transmitting the CQI report to the network. As a result of this process, a delay, denoted $T_{CSI\_REPORTING}$ 242, is incurred.

As can be seen from the discussion of the SCell activation process 200, the amount of time required to perform SCell activation can be significant. For instance, in the case where an unknown target SCell operating in a FR2 band with an undetermined TCI state, the delay $T_{ACTIVATION\_TIME}$ 244 between acknowledgement 204 of the SCell Activation command 202 and transmission of the CQI report 240 can be equal to the sum of $T_{MAC\_CE}+T_{SEARCH\_AGC}+T_{L1\text{-}RSRP\_MEAS}+T_{L1\text{-}RSRP\_REPORT}+T_{UNCERTAINTY\_MAC}+T_{HARQ}+T_{MAC\_CE}+T_{FINE\_TIMING}+T_{SSB}+T_{CSI\_REPORTING}$. While various other scenarios for SCell activation are possible due to changes in factors such as operating frequency range, cell knowledge, and the configuration of SSBs, among others, the activation delay remains significant.

For instance, 3GPP TS38.133 provides an example of the activation time in 5G NR when the target SCell is known and the first cell in the band:

If the SCell being activated belongs to FR2 and if there is no active serving cell on that FR2 band provided that PCell or PSCell is in FR1 or in FR2:

If the target SCell is known to UE and semi-persistent CSI-RS is used for CSI reporting, then $T_{activation\_time}$ is:

3 ms+max($T_{uncertainty\_MAC}$+$T_{FineTiming}$+2 ms, $T_{uncertainty\_SP}$), where $T_{uncertainty\_MAC}$=0 and $T_{uncertainty\_SP}$=0 if UE receives the SCell activation command, semi-persistent CSI-RS activation command and TCI state activation command at the same time.

If the target SCell is known to UE and periodic CSI-RS is used for CSI reporting, then $T_{activation\_time}$ is.

max($T_{uncertainty\_MAC}$+5 ms+$T_{FineTiming}$, $T_{uncertainty\_RRC}$+$T_{RRC\_delay}$−$T_{HARQ}$), where $T_{uncertainty\_MAC}$=0 if UE receives the SCell activation command and TCI state activation commands at the same time.

In this scenario, the target cell is known, but the SCell transmission beam is not decided or subject to change. During the SCell activation process (e.g., the process 200), the network may send the TCI state activation MAC-CE command to indicate the target SCell beam, which introduces $T_{uncertainty\_MAC}$ as a delay. Moreover, once the SCell transmission beam is indicated, the standard allows the UE to spend an additional time of $T_{FineTiming}$ to refine the time and frequency error. Thus, regardless of the particular scenario, the UE has to spend time measuring the time and/or frequency errors and compensating the error(s), which is conditional on the TCI indication. In the current framework, this is done during a time period $T_{FineTiming}$+2 ms, and the network must assume the worst cast for this time to ensure that the UE has sufficient opportunity to perform quality measurement and refinement for the integrity of subsequent reports (e.g., the CQI report) and communications.

To reduce the time needed for SCell activation in some scenarios, the techniques described here allow a UE to store time, frequency, and/or power information (e.g., TO, FO, and/or RSRP) for a priority list of candidate SSBs before receipt of the TCI state indication. This priority list of candidate SSBs can include those SSBs corresponding to transmission beams that the network is likely to select for communication with the UE, and can be determined or prioritized by the UE based on, for example, SSB-related measurements. Once the TCI state is received, the UE can leverage its prior knowledge of the time, frequency, and/or power information for a selected SSB to adjust one or more receiver parameters (e.g., a FFT window) without requiring an additional delay for fine time tracking. As a result, the delay associated with SCell activation is reduced, thereby improving SCell activation.

As an example, assume a semi-persistent CSI-RS for CQI is activated together with the TCI state activation command, and that the target SSB has a period of 20 ms. Per 3GPP requirements, $T_{activation\_time}$=3 ms+max($T_{uncertainty\_MAC}$+$T_{FineTiming}$+2 ms, $T_{uncertainty\_SP}$). Thus, under the current framework, $T_{activation\_time}$ would be equal to 25 ms when $T_{uncertainty\_MAC}$=0 and $T_{uncertainty\_SP}$=0. In contrast, the techniques describe here would reduce $T_{activation\_time}$ to 5 ms by leveraging known time, frequency, and/or power information for the SSB to forgo $T_{FineTiming}$.

In some examples, to generate the list of candidate SSBs, the UE identifies the QCL source SSBs or other RSs of configured CSI-RS resources when SCells are added and/or configured. Typically, one or more CSI-RS resources are configured for SCells, and the QCL source SSB is provided by RRC IE of qcl-InfoPeriodicCSI-RS for a CSI-RS resource. The QCL source SSBs of configured CSI-RS resources can be included in a set of candidate SSBs referred to herein as Set A. Set A may or may not be available depending on whether the network has configured CSI-RS resources for CQI when SCells are added.

In some examples, the UE registers detected SSBs that have been reported to the network via L3-RSRP reports. These SSBs can be included in a set of candidate SSBs referred to herein as Set B. The UE may also form another set of candidate SSBs, referred to herein as Set C, based on the configured SSBs for the L1-RSRP reports. Note that the network may configure SSBs in RRC IE ssb-PositionInBurst for every added SCells, but not all of these SCells may be detectable by the UE. Thus, the UE may need to detect and/or measure configured SSBs in various procedures for L1 and/or L3 reporting (e.g., those procedures described above with reference to FIG. 2).

For each SCell to be activated, the UE can determine a priority list of candidate SSBs as the intersection of Set A and Set B and/or Set C. If Set A is not available, the priority list can be based solely on Set B and/or Set C. The UE can then perform measurements (e.g., TO, FO, and/or RSRP measurements) on each SSB in the priority list of candidate SSBs to obtain time, frequency, and/or power information (e.g., TO, FO, and/or RSRP) for the respective SSB. These measurements can be made at any time between addition/configuration of the SCells by RRC and receipt of the MAC-CE TCI state activation command for the SCell to be activated, such as before the MAC-CE activation command or in parallel with the L1 and/or L3 RSRP measurements, among other times. In some examples, the measurements are made continuously between the time when the SCells are added by RRC and receipt of the MAC-CE TCI state activation command for the SCell to be activated. In some examples, various criteria, such as RSRP and/or SINR, can be used (e.g., in combination with a threshold or the like) to downsize the priority list of candidate SSBs. In some examples, the priority list of candidate SSBs can be ranked according to a ranking criteria. For example, SS-RSRP and/or SS-SINR can be used to rank the L3 SSBs in the priority list, and L1-RSRP and/or L1-SINR can be used to rank the L1 SSBs in the priority list. The UE can choose one or more candidate SSBs in the priority list (e.g., based on the ranking criteria) for continuous TO/FO measurement and storage of the results.

Upon receipt of the MAC-CE TCI state activation command, the UE can check whether the SSB of the QCL source RS indicated in the indicated TCI state is included in the priority list of candidate SSBs. In particular, the UE can check the SSB of the QCL source RS TCI-State::QCL-Info::referenceSignal:

```
TCI-State ::= SEQUENCE {
    tci-StateId           TCI-StateId,
    qcl-Type1             QCL-Info,
    qcl-Type2             QCL-Info OPTIONAL, -- Need R
    ...
}
QCL-Info ::= SEQUENCE {
    cell                  ServCellIndex OPTIONAL, -- Need R
    bwp-Id                BWP-Id OPTIONAL, -- Cond CSI-RS-Indicated
    referenceSignal                 CHOICE {
        csi-rs                      NZP-CSI-RS-ResourceId,
        ssb                         SSB-Index
    },
    qcl-Type              ENUMERATED {typeA, typeB, typeC, typeD},
    ...
```

If the QCL source SSB indicated in the TCI state is included in the priority list of candidate SSBs, the UE uses the known time, frequency, and/or power information for the SSB, such as the known TO, FO, and/or RSRP for the SSB, to adjust one or more receive parameters (e.g., a FFT window) and/or otherwise prepare the UE for subsequent communication with the SCell. In this manner, the UE can skip the fine tracking step and proceed directly to measuring the configured CSI-RS in order to generate the CQI and complete the activation procedure. As a result, the SCell activation time can be reduced by the length of the fine tracking procedure (e.g., $T_{FineTiming}$+2 ms). On the other hand, if the QCL source SSB indicated in the TCI state is not included in the priority list of candidate SSBs, the UE can follow the normal fine tracking procedure to complete SCell activation. Note that this procedure can be performed for each SCell to be activated, and the lists of candidate SSBs (e.g., Sets A, B, and/or C) can be formed on a per-SCell basis.

In some examples, the UE can employ tracking reference signals (TRSs) to obtain time, frequency, and/or power information prior to receipt of the MAC-CE TCI state activation command. For example, if the network has configured a TRS signal for the target SCell, and the QCL source RS is one of the prioritized SSBs, then the UE can use the TRS for predicting the TO, FO, and/or RSRP and can store this information. If the reference signal of the TCI state is the same SSB as the QCL source of the TRS, the UE refines the TO/FO with the stored TRS-based information, skips the fine timing procedure, and proceeds with CQI measurement and reporting to complete the SCell activation procedure.

Figure 3:
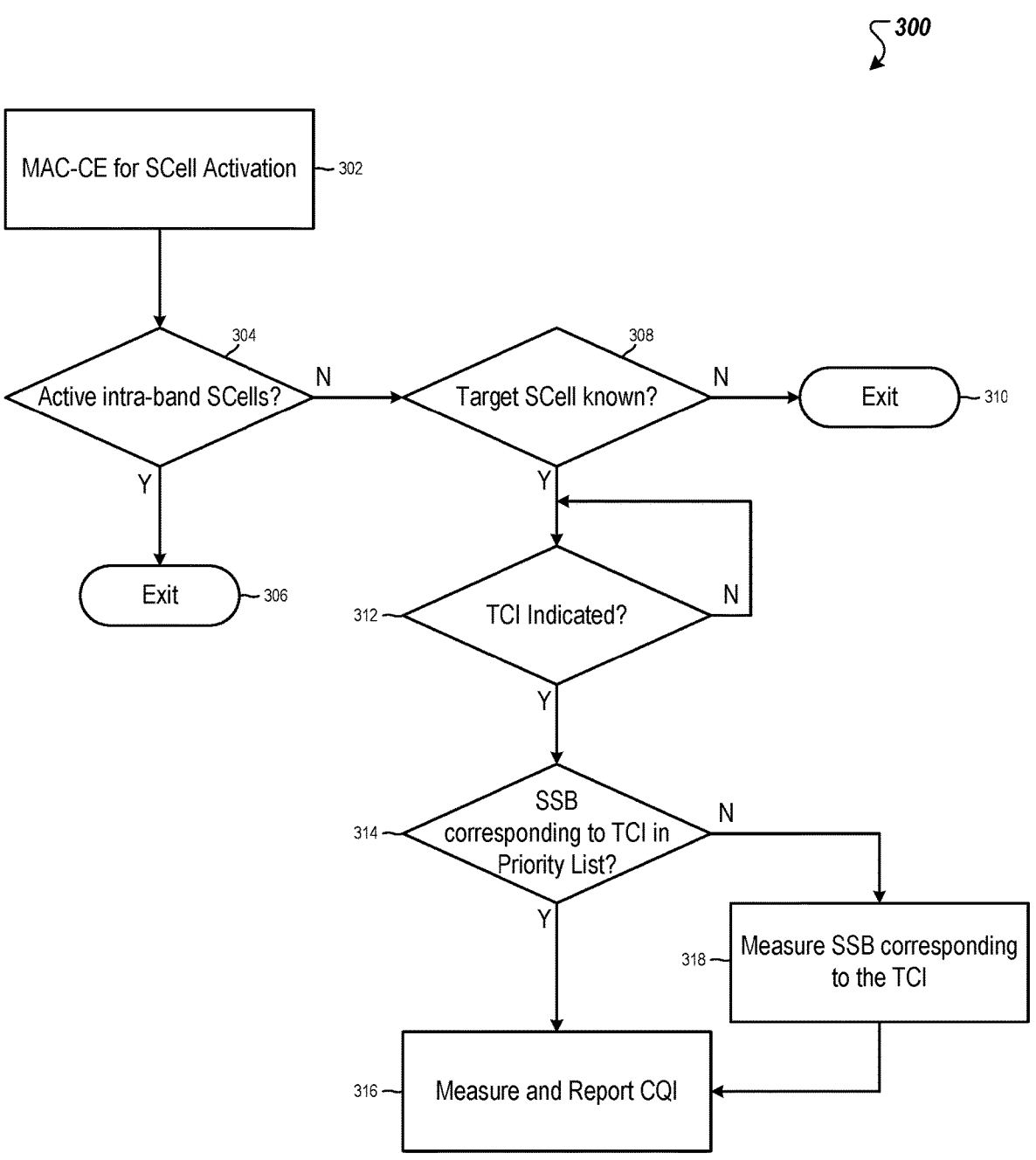
FIG. 3 illustrates a flowchart of an example process, in accordance with some embodiments.

FIG. 3 illustrates a flowchart of an example process 300 for reducing SCell activation delay, in accordance with some embodiments. For clarity of presentation, the description that follows generally describes process 300 in the context of the other figures in this description. For example, process 300 can be performed by UE 102 (in combination with base station 104) of FIG. 1. It will be understood that process 300 can be performed, for example, by any suitable system, environment, software, hardware, or a combination of systems, environments, software, and hardware, as appropriate. In some implementations, various steps of process 300 can be run in parallel, in combination, in loops, or in any order.

In this example, the process 300 begins with the UE receiving 302 a MAC-CE SCell activation command. The SCell activation command can indicate one or more previously-configured SCell(s) that are to be activated by the UE. After receiving the SCell activation command 302, the UE determines 304 whether there are any active intra-band SCells for the target SCell. In this example, if there are any active intra-band SCells for the target SCell, the process 300 exits 306. Otherwise, if there are no active intra-band SCells for the target SCell, the UE determines 308 whether the target SCell is known. If not, the process 300 exits 310 in this example.

If the target SCell is known, the UE determines 312 whether TCI state has been indicated (e.g., by a MAC-CE command). If not, the UE continues to wait for receipt of a TCI state indication, as such an indication is a prerequisite for subsequent steps in this example. Once a TCI state indication has been received, the UE determines 314 whether the QCL source SSB indicated in the TCI state is included in the priority list of candidate SSBs, as described herein. If the QCL source SSB indicated in the TCI state is included in the priority list of candidate SSBs, the UE uses the known time, frequency, and/or power information (e.g., TO, FO, and/or RSRP) for the SSB to adjust its receiver and proceed directly to measuring 316 and reporting the CQI without performing additional measurements on the SSB corresponding to the TCI state (and thus reducing SCell activation delay by, e.g., $T_{FineTiming}$+$T_{SSB}$). As described herein, the time, frequency, and/or power information for each SSB in the priority list of candidate SSBs can be stored prior to receipt of the TCI state indication (e.g., prior to operation 312). On the other hand, if the QCL source SSB indicated in the TCI state is not included in the priority list of candidate SSBs, the UE defaults to measuring 318 the SSB indicted in the TCI state and, after a delay of $T_{FineTiming}$ (+$T_{SSB}$), measuring 316 and reporting the CQI.

FIG. 4 illustrates a flowchart of an example process 400, in accordance with some implementations. For clarity of presentation, the description that follows generally describes process 400 in the context of the other figures in this description. For example, process 400 can be performed by UE 102 (in combination with base station 104) of FIG. 1. It will be understood that process 400 can be performed, for example, by any suitable system, environment, software, hardware, or a combination of systems, environments, software, and hardware, as appropriate. In some implementations, various steps of process 400 can be run in parallel, in combination, in loops, or in any order.

Operations of the process 400 include determining 402 time or frequency synchronization information for each of one or more candidate SSBs of an SCell before receipt of a TCI state activation command or an SCell activation command, or both. For instance, a UE (e.g., the UE 102) can process SSBs or other signals (e.g., TRS signals) received before the TCI state activation command and/or the SCell activation command to determine a TO, FO, and/or other timing or frequency synchronization information for each of the one or more candidate SSBs. In some examples, the UE can determine the time or frequency synchronization information for some or all of the candidate SSBs before receipt of the SCell activation command. In some examples, the UE can determine the time or frequency synchronization information for some or all of the candidate SSBs during a time between receipt of the SCell activation command and the TCI state activation command. The time or frequency synchronization information for each of the one or more candidate SSBs can be stored in hardware storage for later retrieval.

In some examples, the one or more candidate SSBs correspond to transmission beams that the network is likely to select for communication with the UE. In some examples, the one or more candidate SSBs can include those the QCL source SSBs of CSI-RS resources configured for the UE (e.g., Set A), SSBs that have been identified by the UE via L3-RSRP procedures (e.g., Set B), SSBs that have been identified by the UE via L1-RSRP procedures (e.g., Set C), or combinations of them, among others. In some examples, the UE can prioritize or reduce the list of candidate SSBs based on, for example, received power measurements.

At 404, the UE receives the TCI state activation command. In some examples, the UE identifies one of the one or more candidate SSBs based on a TCI state indicated in the TCI state activation command. For example, the UE can identify a QCL source SSB associated with the TCI state indicated in the TCI state activation command, and can compare the identified QCL source SSB with the one or more candidate SSBs to identify one of the candidate SSBs. If the UE determines that one of the candidate SSBs corresponds to an SSB associated with the TCI state, then the UE can leverage the stored time or frequency synchronization information to skip the fine timing period included in the SCell activation procedure (and proceed to 406). On the other hand, if the UE determines that there is no stored time or frequency information for the SSB associated with the TCI state (e.g., the SSB associated with the TCI state is not on the candidate list), then the UE can perform fine timing to complete the SCell activation procedure (e.g., as shown in FIG. 3).

Based on the TCI state activation command, the UE receives 406 at least one signal from the SCell using the determined time or frequency synchronization information for one of the one or more candidate SSBs. For example, the UE can adjust at least one receive parameter, such as a FFT window, to receive the at least one signal from the SCell. In some examples, the at least one signal is a CSI-RS signal that is transmitted by the SCell as part of the SCell activation procedure.

In some examples, the UE determine power information instead of or in addition to the time or frequency information for each of the one or more candidate SSBs before receipt of the TCI state activation command of the SCell activation command, or both. For example, the UE can determine RSRP information for each of the one or more candidate SSBs, and can store this information in hardware storage. Based on the received TCI state activation command, the UE can receive at least one signal from the SCell using the determined power information for one of the one or more candidate SSBs.

Figure 5:
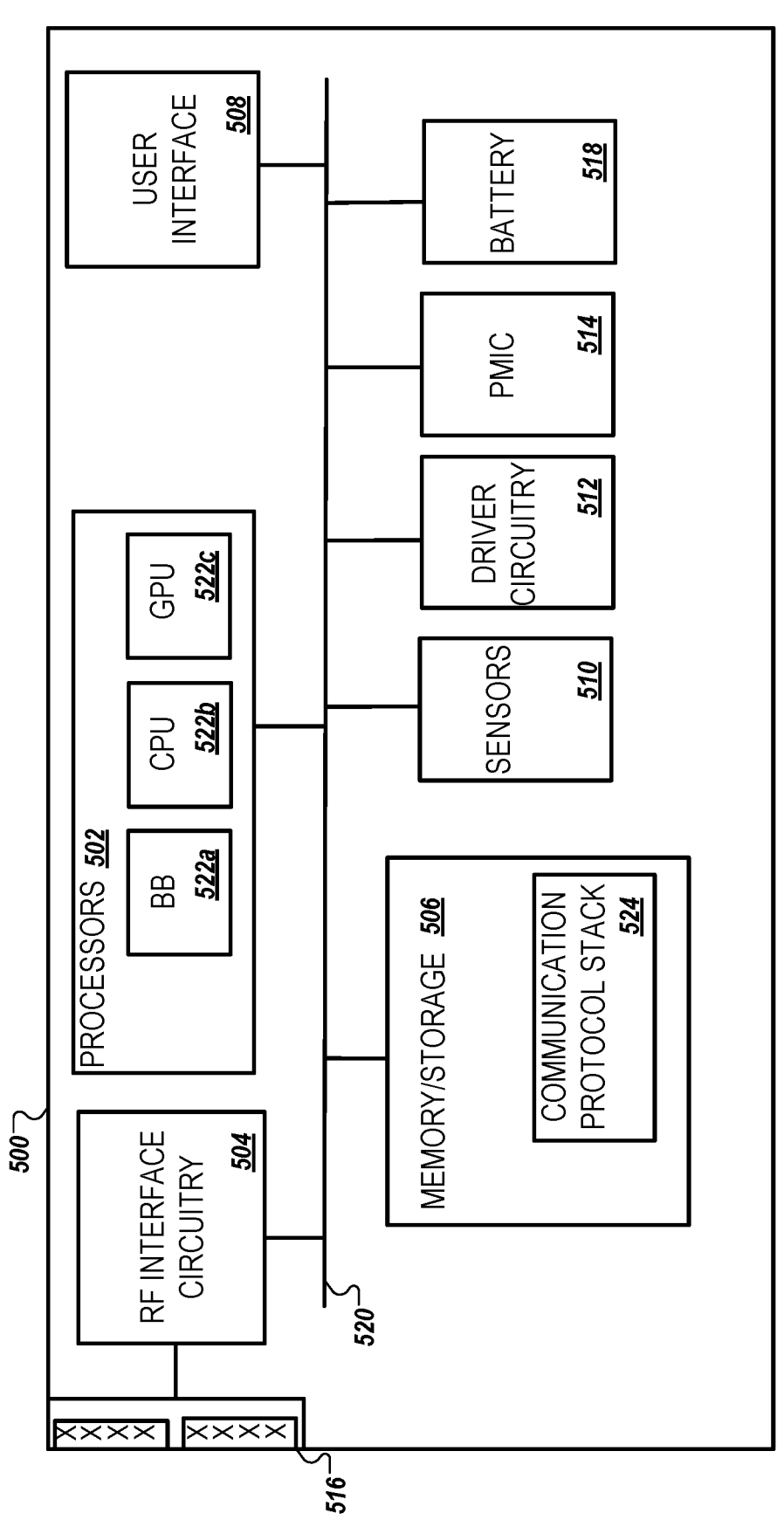
FIG. 5 illustrates a user equipment (UE), in accordance with some embodiments.

FIG. 5 illustrates a UE 500, in accordance with some embodiments. The UE 500 may be similar to and substantially interchangeable with UE 102 of FIG. 1.

The UE 500 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance/monitoring devices (for example, cameras, video cameras, etc.), wearable devices (for example, a smart watch), relaxed-IoT devices.

The UE 500 may include processors 502, RF interface circuitry 504, memory/storage 506, user interface 508, sensors 510, driver circuitry 512, power management integrated circuit (PMIC) 514, antenna structure 516, and battery 518. The components of the UE 500 may be implemented as integrated circuits (ICs), portions thereof, discrete electronic devices, or other modules, logic, hardware, software, firmware, or a combination thereof. The block diagram of FIG. 5 is intended to show a high-level view of some of the components of the UE 500. However, some of the components shown may be omitted, additional components may be present, and different arrangement of the components shown may occur in other implementations.

The components of the UE 500 may be coupled with various other components over one or more interconnects 520, which may represent any type of interface, input/output, bus (local, system, or expansion), transmission line, trace, optical connection, etc. that allows various circuit components (on common or different chips or chipsets) to interact with one another.

The processors 502 may include processor circuitry such as, for example, baseband processor circuitry (BB) 522A, central processor unit circuitry (CPU) 522B, and graphics processor unit circuitry (GPU) 522C. The processors 502 may include any type of circuitry or processor circuitry that executes or otherwise operates computer-executable instructions, such as program code, software modules, or functional processes from memory/storage 506 to cause the UE 500 to perform operations as described herein.

In some embodiments, the baseband processor circuitry 522A may access a communication protocol stack 524 in the memory/storage 506 to communicate over a 3GPP compatible network. In general, the baseband processor circuitry 522A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum layer. In some embodiments, the PHY layer operations may additionally/alternatively be performed by the components of the RF interface circuitry 504. The baseband processor circuitry 522A may generate or process baseband signals or waveforms that carry information in 3GPP-compatible networks. In some embodiments, the waveforms for NR may be based cyclic prefix OFDM "CP-OFDM" in the uplink or downlink, and discrete Fourier transform spread OFDM "DFT-S-OFDM" in the uplink.

The memory/storage 506 may include one or more non-transitory, computer-readable media that includes instructions (for example, communication protocol stack 524) that may be executed by one or more of the processors 502 to cause the UE 500 to perform various operations described herein. The memory/storage 506 include any type of volatile or non-volatile memory that may be distributed throughout the UE 500. In some embodiments, some of the memory/storage 506 may be located on the processors 502 themselves (for example, L1 and L2 cache), while other memory/storage 506 is external to the processors 502 but accessible thereto via a memory interface. The memory/storage 506 may include any suitable volatile or non-volatile memory such as, but not limited to, dynamic random access memory (DRAM), static random access memory (SRAM), erasable programmable read only memory (EPROM), electrically erasable programmable read only memory (EEPROM), Flash memory, solid-state memory, or any other type of memory device technology.

The RF interface circuitry 504 may include transceiver circuitry and radio frequency front module (RFEM) that allows the UE 500 to communicate with other devices over a radio access network. The RF interface circuitry 504 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via antenna structure 516 and proceed to filter and amplify (with a low-noise amplifier) the signal. The signal may be provided to a receiver of the transceiver that downconverts the RF signal into a baseband signal that is provided to the baseband processor of the processors 502.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 516.

In various embodiments, the RF interface circuitry 504 may be configured to transmit/receive signals in a manner compatible with NR access technologies.

The antenna 516 may include antenna elements to convert electrical signals into radio waves to travel through the air and to convert received radio waves into electrical signals. The antenna elements may be arranged into one or more antenna panels. The antenna 516 may have antenna panels that are omnidirectional, directional, or a combination thereof to enable beamforming and multiple input, multiple output communications. The antenna 516 may include microstrip antennas, printed antennas fabricated on the surface of one or more printed circuit boards, patch antennas, phased array antennas, etc. The antenna 516 may have one or more panels designed for specific frequency bands including bands in FR1 or FR2.

The user interface 508 includes various input/output (I/O) devices designed to enable user interaction with the UE 500. The user interface 508 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes "LEDs" and multi-character visual outputs), or more complex outputs such as display devices or touchscreens (for example, liquid crystal displays "LCDs," LED displays, quantum dot displays, projectors, etc.), with the output of characters, graphics, multimedia objects, and the like being generated or produced from the operation of the UE 500.

The sensors 510 may include devices, modules, or subsystems whose purpose is to detect events or changes in its environment and send the information (sensor data) about the detected events to some other device, module, subsystem, etc. Examples of such sensors include, inter alia, inertia measurement units including accelerometers, gyroscopes, or magnetometers; microelectromechanical systems or nanoelectromechanical systems including 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 512 may include software and hardware elements that operate to control particular devices that are embedded in the UE 500, attached to the UE 500, or otherwise communicatively coupled with the UE 500. The driver circuitry 512 may include individual drivers allowing other components to interact with or control various input/output (I/O) devices that may be present within, or connected to, the UE 500. For example, driver circuitry 512 may include a display driver to control and allow access to a display device, a touchscreen driver to control and allow access to a touchscreen interface, sensor drivers to obtain sensor readings of sensor circuitry 528 and control and allow access to sensor circuitry 528, drivers to obtain actuator positions of electro-mechanic components or control and allow access to the electro-mechanic components, a camera driver to control and allow access to an embedded image capture device, audio drivers to control and allow access to one or more audio devices.

The PMIC 514 may manage power provided to various components of the UE 500. In particular, with respect to the processors 502, the PMIC 514 may control power-source selection, voltage scaling, battery charging, or DC-to-DC conversion.

In some embodiments, the PMIC 514 may control, or otherwise be part of, various power saving mechanisms of the UE 500 including DRX as discussed herein. A battery 518 may power the UE 500, although in some examples the UE 500 may be mounted deployed in a fixed location, and may have a power supply coupled to an electrical grid. The battery 518 may be a lithium ion battery, a metal-air battery, such as a zinc-air battery, an aluminum-air battery, a lithium-air battery, and the like. In some implementations, such as in vehicle-based applications, the battery 518 may be a typical lead-acid automotive battery.

Figure 6:
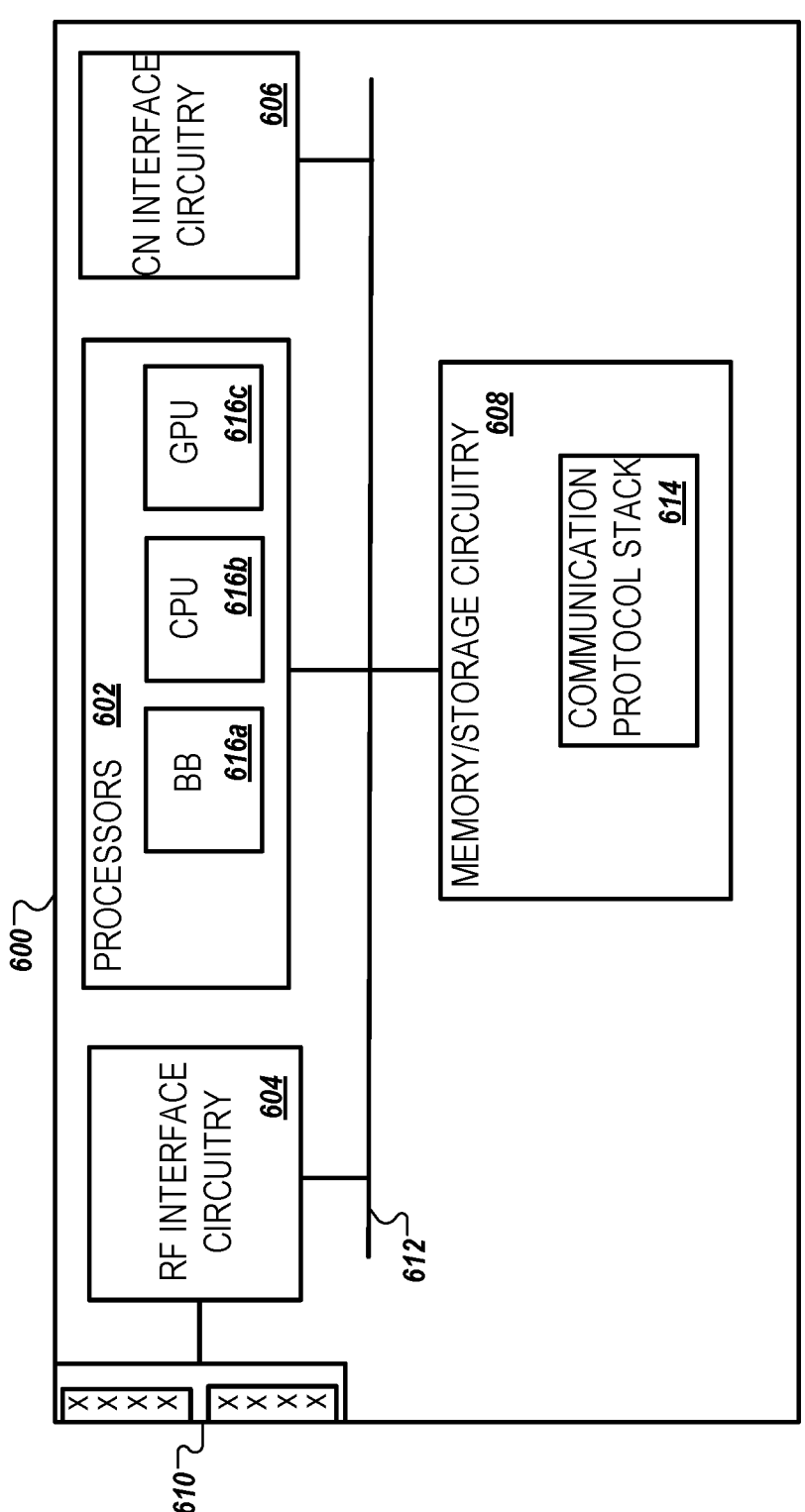
FIG. 6 illustrates an access node, in accordance with some embodiments.

FIG. 6 illustrates an access node 600 (e.g., a base station or gNB), in accordance with some embodiments. The access node 600 may be similar to and substantially interchangeable with base station 104. The access node 600 may include processors 602, RF interface circuitry 604, core network (CN) interface circuitry 606, memory/storage circuitry 608, and antenna structure 610.

The components of the access node 600 may be coupled with various other components over one or more interconnects 612. The processors 602, RF interface circuitry 604, memory/storage circuitry 608 (including communication protocol stack 614), antenna structure 610, and interconnects 612 may be similar to like-named elements shown and described with respect to FIG. 5. For example, the processors 602 may include processor circuitry such as, for example, baseband processor circuitry (BB) 616A, central processor unit circuitry (CPU) 616B, and graphics processor unit circuitry (GPU) 616C.

The CN interface circuitry 606 may provide connectivity to a core network, for example, a 5th Generation Core network (5GC) using a 5GC-compatible network interface protocol such as carrier Ethernet protocols, or some other suitable protocol. Network connectivity may be provided to/from the access node 600 via a fiber optic or wireless backhaul. The CN interface circuitry 606 may include one or more dedicated processors or FPGAs to communicate using one or more of the aforementioned protocols. In some implementations, the CN interface circuitry 606 may include multiple controllers to provide connectivity to other networks using the same or different protocols.

As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can include ground stations (e.g., terrestrial access points) or satellite stations providing coverage within a geographic area (e.g., a cell). As used herein, the term "NG RAN node" or the like may refer to an access node 600 that operates in an NR or 5G system (for example, a gNB), and the term "E-UTRAN node" or the like may refer to an access node 600 that operates in an LTE or 4G system (e.g., an eNB). According to various embodiments, the access node 600 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the access node 600 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by the access node 600; a MAC/PHY split wherein RRC, PDCP, RLC, and MAC layers are operated by the CRAN/vBBUP and the PHY layer is operated by the access node 600; or a "lower PHY" split wherein RRC, PDCP, RLC, MAC layers and upper portions of the PHY layer are operated by the CRAN/vBBUP and lower portions of the PHY layer are operated by the access node 600.

In V2X scenarios, the access node 600 may be or act as RSUs. The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary embodiments are provided.

Example 1 includes determining time or frequency synchronization information for each of one or more candidate synchronization signal blocks (SSBs) for a secondary cell (SCell) before receipt of a transmission configuration indication (TCI) state activation command or a SCell activation command, receiving the TCI state activation command, and based on the received TCI state activation command, receiving at least one signal from the SCell using the determined time or frequency synchronization information for one of the one or more candidate SSBs.

Example 2 includes the time or frequency information for each of the one or more candidate SSBs being a time offset (TO) or a frequency offset (FO).

Example 3 includes determining power information for each of the one or more candidate SSBs before receipt of the TCI state activation command or the SCell activation command, and based on the received TCI state activation command, receiving the at least one signal from the SCell using the determined power information for one of the one or more candidate SSBs.

Example 4 includes the power information for each of the one or more candidate SSBs including a received signal reference power (RSRP).

Example 5 includes determining the time or frequency synchronization information for at least one of the one or more candidate SSBs during a period between receipt of the SCell activation command and the TCI state activation command.

Example 6 includes identifying one of the one or more candidate SSBs based on a TCI state indicated in the TCI state activation command.

Example 7 includes the one of the one or more candidate SSBs being a quasi-co-located (QCL) source SSB associated with the TCI state indicated in the TCI state activation command.

Example 8 includes adjusting at least one receive parameter based on the time or frequency synchronization information for the one of the one or more candidate SSBs.

Example 9 includes the at least one receive parameter being a parameter of a fast fourier transform (FFT) window.

Example 10 includes the at least one signal being a channel state information reference signal (CSI-RS) from the SCell.

Example 11 includes skipping a fine timing period included in an activation procedure for the SCell in response to determining that one of the one or more candidate SSBs corresponds to the SSB associated with a TCI state indicated in the TCI state activation command.

Example 12 includes determining the one or more candidate SSBs for the SCell.

Example 13 includes determining at least one of the one or more candidate SSBs for the SCell by identifying a quasi-co-located (QCL) source SSB for a channel state information reference signal (CSI-RS) configured for the SCell.

Example 14 includes determining at least one of the one or more candidate SSBs for the SCell by detecting an SSB that is referenced in a layer 1 received signal reference power (L1-RSRP) or a layer 3 RSRP (L3-RSRP).

Example 15 includes measuring a tracking reference signal (TRS) before receipt of the TCI state activation command or the SCell activation command to determine the time or frequency synchronization information.

Example 16 includes storing, in a hardware storage device, the time or frequency synchronization information for each of the one or more candidate SSBs.

Example 17 may include one or more non-transitory computer-readable media including instructions to cause an electronic device, upon execution of the instructions by one or more processors of the electronic device, to perform one or more elements of a method described in or related to any of examples 1-16, or any other method or process described herein.

Example 18 may include an apparatus including logic, modules, or circuitry to perform one or more elements of a method described in or related to any of examples 1-16, or any other method or process described herein.

Example 19 may include a method, technique, or process as described in or related to any of examples 1-16, or portions or parts thereof.

Example 20 may include an apparatus including: one or more processors and one or more computer-readable media including instructions that, when executed by the one or more processors, cause the one or more processors to perform the method, techniques, or process as described in or related to any of examples 1-16, or portions thereof.

Example 21 may include a signal as described in or related to any of examples 1-16, or portions or parts thereof.

Example 22 may include a datagram, information element, packet, frame, segment, PDU, or message as described in or related to any of examples 1-16, or portions or parts thereof, or otherwise described in the present disclosure.

Example 23 may include a signal encoded with data as described in or related to any of examples 1-16, or portions or parts thereof, or otherwise described in the present disclosure.

Example 24 may include a signal encoded with a datagram, IE, packet, frame, segment, PDU, or message as described in or related to any of examples 1-16, or portions or parts thereof, or otherwise described in the present disclosure.

Example 25 may include an electromagnetic signal carrying computer-readable instructions, wherein execution of the computer-readable instructions by one or more processors is to cause the one or more processors to perform the method, techniques, or process as described in or related to any of examples 1-16, or portions thereof.

Example 26 may include a computer program including instructions, wherein execution of the program by a processing element is to cause the processing element to carry out the method, techniques, or process as described in or related to any of examples 1-16, or portions thereof. The operations or actions performed by the instructions executed by the processing element can include the methods of any one of examples 1-16.

Example 27 may include a signal in a wireless network as shown and described herein.

Example 28 may include a method of communicating in a wireless network as shown and described herein.

Example 29 may include a system for providing wireless communication as shown and described herein. The operations or actions performed by the system can include the methods of any one of examples 1-12.

Example 30 may include a device for providing wireless communication as shown and described herein. The operations or actions performed by the device can include the methods of any one of examples 1-12.

The previously-described examples 1-16 are implementable using a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

A system, e.g., a base station, an apparatus including one or more baseband processors, and so forth, can be configured to perform particular operations or actions by virtue of having software, firmware, hardware, or a combination of them installed on the system that in operation causes or cause the system to perform the actions. The operations or actions performed either by the system can include the methods of any one of examples 1-16.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

We claim:

1. A method comprising:

determining time or frequency synchronization information for each of one or more candidate synchronization signal blocks (SSBs) for a secondary cell (SCell) before receipt of a transmission configuration indication (TCI) state activation command or a SCell activation command;

receiving the TCI state activation command; and based on the received TCI state activation command, skipping a fine timing period included in an activation procedure for the SCell in response to determining that one of the one or more candidate SSBs corresponds to an SSB associated with a TCI state indicated by the TCI state activation command; and receiving at least one signal from the SCell using the determined time or frequency synchronization information for the one of the one or more candidate SSBs.

2. The method of claim 1, wherein the time or frequency information for each of the one or more candidate SSBs comprises a time offset (TO) or a frequency offset (FO).

3. The method of claim 1, comprising:

determining power information for each of the one or more candidate SSBs before receipt of the TCI state activation command or the SCell activation command; and based on the received TCI state activation command, receiving the at least one signal from the SCell using the determined power information for one of the one or more candidate SSBs.

4. The method of claim 3, wherein the power information for each of the one or more candidate SSBs comprises a received signal reference power (RSRP).

5. The method of claim 1, comprising determining the time or frequency synchronization information for at least one of the one or more candidate SSBs during a period between receipt of the SCell activation command and the TCI state activation command.

6. The method of claim 1, comprising identifying the one of the one or more candidate SSBs based on a TCI state indicated in the TCI state activation command.

7. The method of claim 6, wherein the one of the one or more candidate SSBs comprises a quasi-co-located (QCL) source SSB associated with the TCI state indicated in the TCI state activation command.

8. The method of claim 1, comprising adjusting at least one receive parameter based on the time or frequency synchronization information for the one of the one or more candidate SSBs.

9. The method of claim 8, wherein the at least one receive parameter comprises a parameter of a fast fourier transform (FFT) window.

10. The method of claim 1, wherein the at least one signal comprises a channel state information reference signal (CSI-RS) from the SCell.

11. The method of claim 1, comprising determining the one or more candidate SSBs for the SCell.

12. The method of claim 11, wherein determining at least one of the one or more candidate SSBs for the SCell comprises identifying a quasi-co-located (QCL) source SSB for a channel state information reference signal (CSI-RS) configured for the SCell.

13. The method of claim 11, wherein determining at least one of the one or more candidate SSBs for the SCell comprises detecting an SSB that is referenced in a layer 1 received signal reference power (L1-RSRP) or a layer 3 RSRP (L3-RSRP).

14. The method of claim 1, comprising measuring a tracking reference signal (TRS) before receipt of the TCI state activation command or the SCell activation command to determine the time or frequency synchronization information.

15. The method of claim 1, comprising storing, in a hardware storage device, the time or frequency synchronization information for each of the one or more candidate SSBs.

16. The method of claim 1, wherein the method is performed by at least one processor of a user equipment.

17. A non-transitory computer storage medium encoded with instructions that, when executed by at least one processor, cause the at least one processor to perform operations comprising:

determining time or frequency synchronization information for each of one or more candidate synchronization signal blocks (SSBs) for a secondary cell (SCell) before receipt of a transmission configuration indication (TCI) state activation command or a SCell activation command, wherein the time or frequency synchronization information for at least one of the one or more candidate SSBs is determined during a period between receipt of the SCell activation command and the TCI state activation command;

receiving the TCI state activation command; and based on the received TCI state activation command, receiving at least one signal from the SCell using the determined time or frequency synchronization information for one of the one or more candidate SSBs.

18. An apparatus comprising at least one baseband processor configured to perform operations comprising:

determining time or frequency synchronization information for each of one or more candidate synchronization signal blocks (SSBs) for a secondary cell (SCell) before receipt of a transmission configuration indication (TCI) state activation command or a SCell activation command;

receiving the TCI state activation command; and based on the received TCI state activation command, skipping a fine timing period included in an activation procedure for the SCell in response to determining that one of the one or more candidate SSBs corresponds to an SSB associated with a TCI state indicated by the TCI state activation command; and receiving at least one signal from the SCell using the determined time or frequency synchronization information for one of the one or more candidate SSBs.

19. The apparatus of claim 18, wherein the time or frequency information for each of the one or more candidate SSBs comprises a time offset (TO) or a frequency offset (FO).

*    *    *    *    *